Aug. 25, 1931.  R. G. ANDERSON  1,820,723
BRAKE RIGGING
Filed Dec. 10, 1929  2 Sheets-Sheet 2
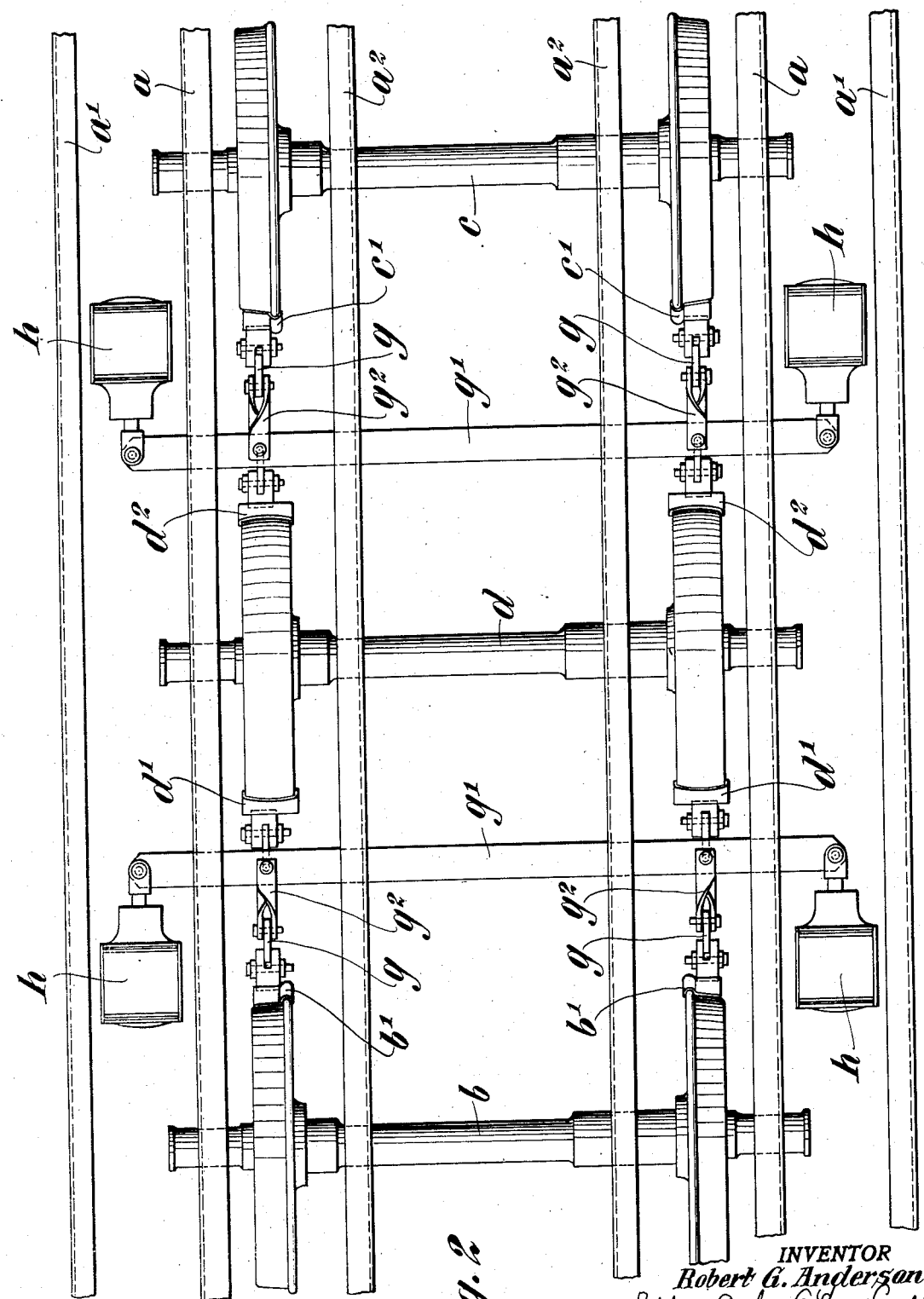
INVENTOR
Robert G. Anderson,
BY Redding, Greeley, O'Shea & Campbell
HIS ATTORNEYS Patented Aug. 25, 1931

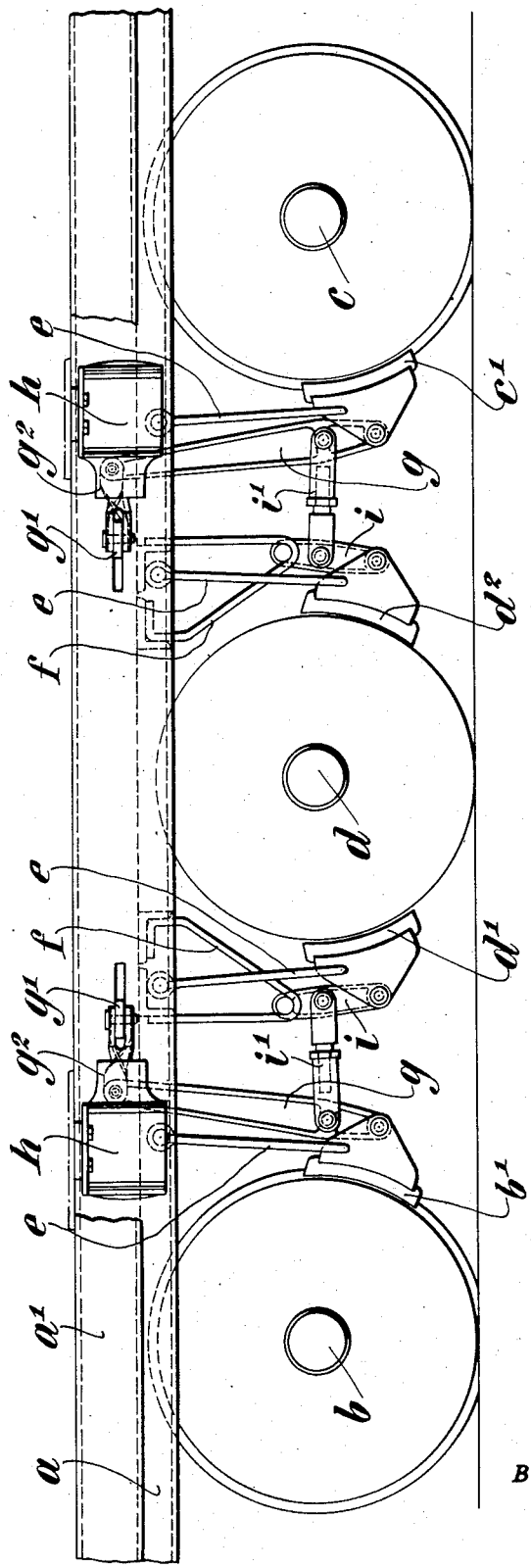

1,820,723

UNITED STATES PATENT OFFICE

ROBERT G. ANDERSON, OF PLAINFIELD, NEW JERSEY, ASSIGNOR TO INTERNATIONAL MOTOR COMPANY, OF NEW YORK, N. Y., A CORPORATION OF DELAWARE

BRAKE RIGGING

Application filed December 10, 1929. Serial No. 412,990.

The present invention relates to railway truck frames and embodies, more specifically, an improved brake rigging for railway trucks, particularly adapted to trucks of the three axle type, all three axles being driven.

In accordance with the present invention, it is contemplated that the braking force on the center wheels be increased by providing two brake shoes for each center wheel, the two acting upon the respective wheels as clasps to cause the braking force to be applied to the rails. Upon the outer wheels, single brake shoes are mounted, the brake shoe upon each outer wheel being operated in conjunction with the proximate brake shoe upon the center wheel. A suitable interconnection therebetween is afforded by means of a linkage which apportions the braking force between these elements. These units are duplicated upon opposite sides of the truck and are operated simultaneously, thus constituting one sysem. The same lever operates the brakes of each system, air cylinders being provided upon each side of the truck for the system, one of the brakes on each side being connected with a common lever upon which air cylinders act to apply the braking force.

An object of the present invention, accordingly, is to provide a braking system in which a maximum braking force is available under all conditions, the failing of one brake operating mechanism immediately being supplemented by a second mechanism.

A further object of the invention is to provide a brake rigging for a three axle truck in which the maximum braking force available upon the respective axles is utilized.

A further object of the invention is to provide a brake rigging of the above character in which the braking force upon the center wheels is multiplied through a suitable connection.

Further objects, not specifically enumerated above, will be apparent as the invention is described in greater detail in connection with the accompanying drawings, wherein:

Figure 1 is a view in side elevation, partly broken away, showing a brake rigging constructed in accordance with the present invention.

Figure 2 is a plan view, showing a brake rigging constructed in accordance with the present invention.

Referring more particularly to the above drawings, $a$ designates the side sills of a truck frame, outriggers $a'$ and supplemental sills $a^2$ being provided for mounting the mechanism described herein. Upon the side sills, front, rear and intermediate axles $b$, $c$, and $d$, respectively, are mounted. These axles may be mounted upon the side sills in the usual manner and such mounting has been illustrated herein in the interest of clearness, the wheels carried by the respective axles having braking forces applied thereto by means of front brake shoes $b'$, rear brake shoes $c'$ and intermediate brake shoes $d'$ and $d^2$, respectively. Suitable hangers $e$ carry the brake shoes upon the truck frame and depending brackets $f$, mounted between the intermediate and front and rear wheels, respectively, support the brake rigging as described in greater detail hereinafter. The brake blocks supporting the front and rear brake shoes $b'$ and $c'$, respectively, are mounted upon levers $g$, such levers being connected at their upper extremities to brake beams $g'$ carried upon the truck frame. Straps $g^2$ connect the levers $g$ with the brake beams and suitably mounted air cylinders $h$ are connected with the ends of each brake beam $g'$ to actuate such brake beams, thus applying the braking force to the wheels.

A short lever $i$ is pivoted to the lower extremities of each of the brackets $f$, the intermediate brake blocks carrying the brake shoes $d'$ and $d^2$ being pivoted to the lower extremities of these levers. Connecting links $i'$ are pivoted to the levers $i$, intermediate the ends thereof, and are also pivoted to the levers $g$ adjacent the mounting of the respective brake blocks thereon.

Upon suitable actuation of the brake beams $g'$, the respective levers $g$ are moved to force the front and rear brake shoes $b'$ and $c'$, respectively, against the wheels. The fulcrums of levers $g$ being movable, do not permit braking action to take place until brake shoes $d'$ and $d^2$ have been moved against the center wheels on the intermediate axle $d$. When this takes place, the reaction to the braking force of the respective shoes is taken by the links $i'$, thus equalizing the braking force between the respective wheels. By varying the relative lengths of the lever arms between the pivot points thereof, the relative braking forces applied to the respective wheels may be varied at will.

From the foregoing, it will be seen that a duplicate system is provided. If one system fails, the air cylinders can be cut out and the remaining system used, giving 50% of the normal braking. The leverage of each shoe on the central wheel is such that it is applied with 50% of the force of the proximate shoes on the respective outer wheels, thus giving the same total braking force on the center wheel as on each outer wheel.

Other advantages, not enumerated above, will be apparent upon a closer study of the system described herein, and while it has been described with specific reference to the accompanying drawings, it is not to be limited, save as defined in the appended claim.

I claim as my invention:

Brake mechanism for a three axle railway truck having three wheels at each side thereof comprising a plurality of brake blocks intermediate adjacent wheels at one side of the truck, means to suspend two of the blocks upon opposite sides of the intermediate wheel to be moved into engagement therewith, levers carrying the other blocks pivotally for movement into engagement with the outer wheels, means to apply braking forces to the other ends of the last named levers, and means to apply substantially one third of the braking force applied to the last named levers to the brake blocks adjacent the intermediate wheels.

This specification signed this 3ᵈ day of December, A. D. 1929.

ROBERT G. ANDERSON.